(12) United States Patent
Van Hove

(10) Patent No.: US 7,815,711 B2
(45) Date of Patent: Oct. 19, 2010

(54) METHOD FOR SEPARATING GASES FROM A GAS MIXTURE AND DEVICE FOR APPLYING SUCH A METHOD

(75) Inventor: Ben Paul Karl Van Hove, Antwerp (BE)

(73) Assignee: Atlas Copco Airpower, Naamloze Vennootschap, Wilrijk (BE)

(*) Notice: Subject to any disclaimer, the term of this patent is extended or adjusted under 35 U.S.C. 154(b) by 995 days.

(21) Appl. No.: 10/573,591

(22) PCT Filed: Sep. 24, 2004

(86) PCT No.: PCT/BE2004/000135

§ 371 (c)(1),
(2), (4) Date: Mar. 27, 2006

(87) PCT Pub. No.: WO2005/030367

PCT Pub. Date: Apr. 7, 2005

(65) Prior Publication Data

US 2007/0034080 A1    Feb. 15, 2007

(30) Foreign Application Priority Data

Oct. 1, 2003   (BE) ................................ 2003/0514

(51) Int. Cl.
*B01D 53/22* (2006.01)
(52) U.S. Cl. .................. 95/45; 95/288; 62/93; 96/4; 55/DIG. 17
(58) Field of Classification Search .............. 95/45, 95/288; 96/4; 55/DIG. 17; 165/1; 62/93
See application file for complete search history.

(56) References Cited

U.S. PATENT DOCUMENTS

| 3,225,517 | A | * | 12/1965 | Wachsmuth | .................. 95/122 |
| 4,582,121 | A | * | 4/1986 | Casey | ..................... 165/104.21 |
| 4,787,919 | A | * | 11/1988 | Campbell et al. | ............... 95/39 |
| 5,048,548 | A | * | 9/1991 | Ramsey, Jr. | .................. 134/108 |
| 5,755,855 | A | * | 5/1998 | Baker et al. | ..................... 95/39 |
| 5,762,685 | A | | 6/1998 | Baker et al. | |
| 5,794,453 | A | | 8/1998 | Barnwell | |
| 6,085,549 | A | * | 7/2000 | Daus et al. | .................... 62/624 |
| 6,865,877 | B2 | * | 3/2005 | Yoshida et al. | ........... 60/39.465 |

FOREIGN PATENT DOCUMENTS

| JP | 63-253633 | 4/1990 |
| JP | 07-219870 | 2/1997 |

\* cited by examiner

*Primary Examiner*—Duane Smith
*Assistant Examiner*—Ives Wu
(74) *Attorney, Agent, or Firm*—Bacon & Thomas, PLLC

(57) ABSTRACT

Improved method for separating gases from a gas mixture, whereby the gas mixture to be treated is led through a membrane separator (3) by means of a compressor installation (2) and whereby the compressed gas mixture to be treated is cooled in the compressor installation (2), among others in order to separate condensate from the gas mixture, after which, as it leaves the compressor installation (2), it will be re-heated before it ends up in the membrane separator (3), characterized in that, in order to re-heat the gas mixture to be treated as it leaves the compressor installation (2), use is made of the recuperation heat of the compressor installation (2) itself.

14 Claims, 3 Drawing Sheets

Figure 7:
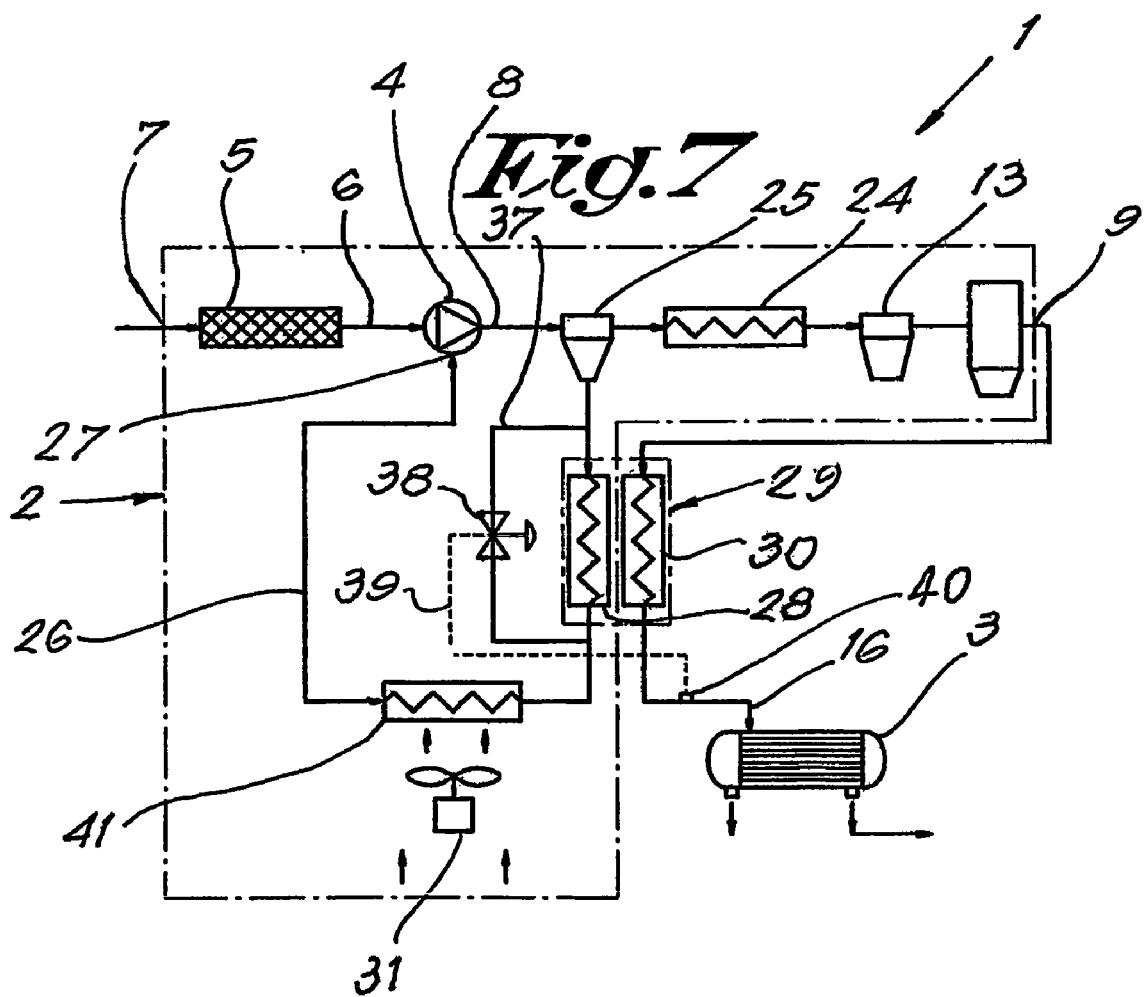

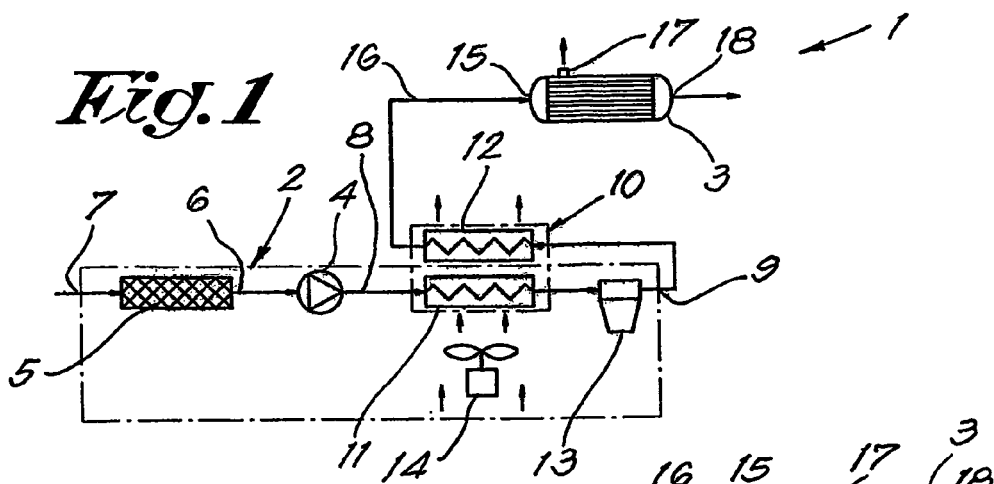
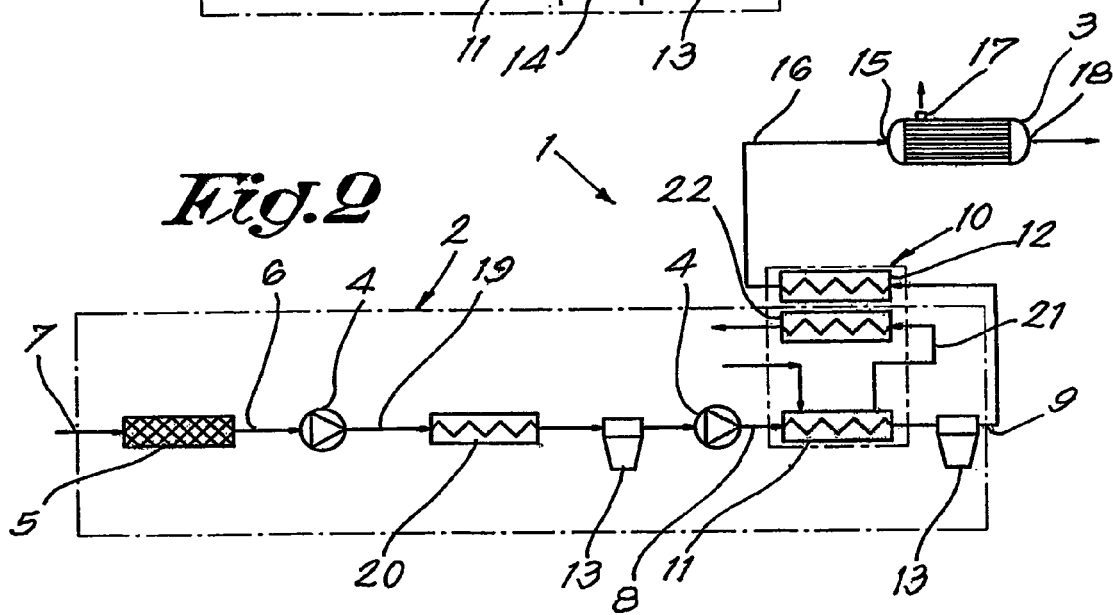
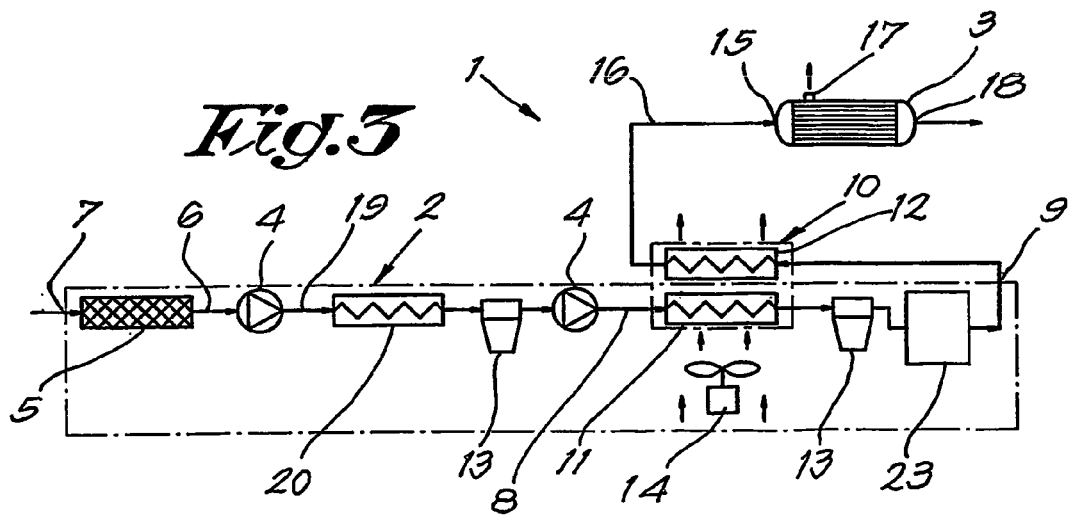

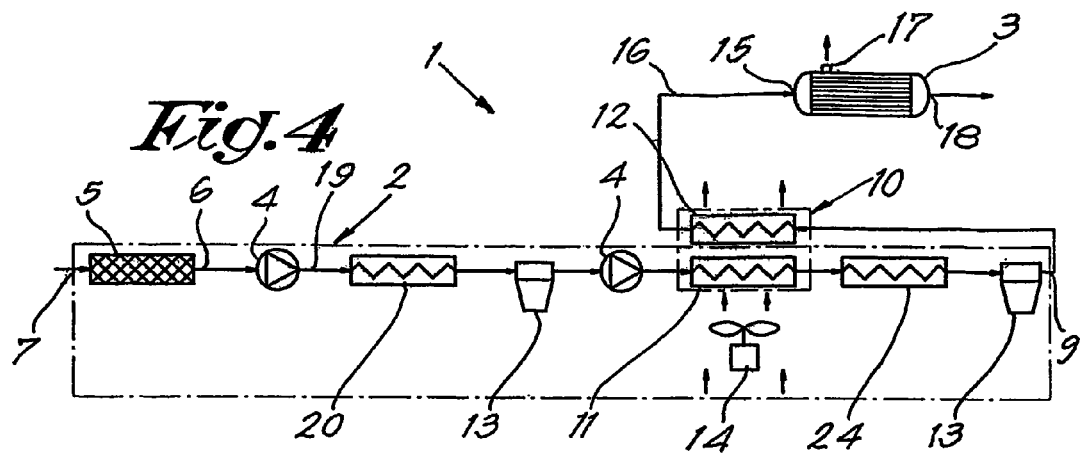
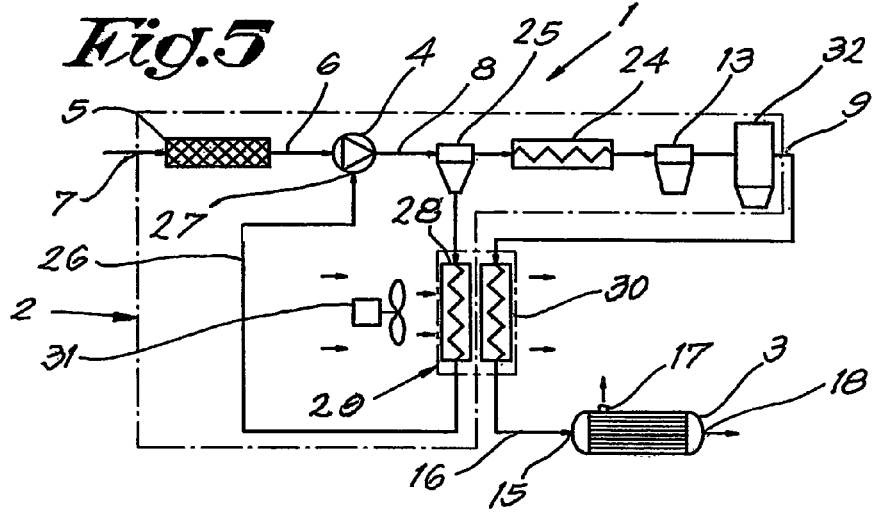
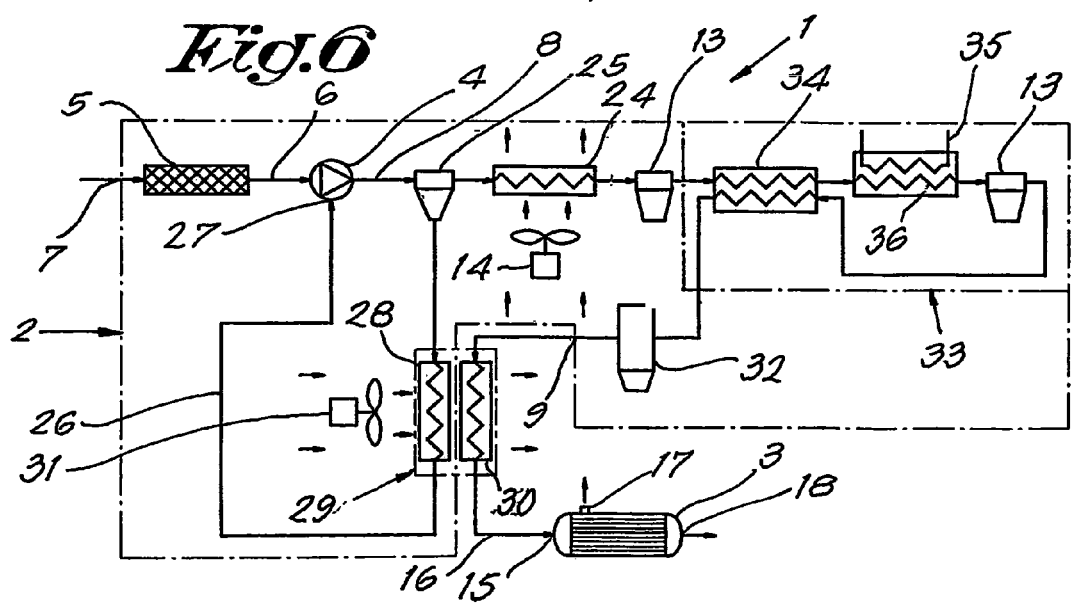

METHOD FOR SEPARATING GASES FROM A GAS MIXTURE AND DEVICE FOR APPLYING SUCH A METHOD

The present invention concerns an improved method for separating gases from a gas mixture.

The invention also concerns a device applying such a method for separating gases from a gas mixture.

More particularly, the invention concerns a known method for separating gases from a gas mixture, for example for separating nitrogen and/or oxygen from air or for separating water vapour from a gas stream or the like, whereby use is made of a membrane separator and whereby the gas mixture to be treated is led through the membrane separator by means of a compressor installation, and whereby the compressed gas mixture is usually cooled in the compressor installation in order to dry and filter the gas mixture by means of condensation techniques.

It is known that the output of the separation of gases, by applying such a method whereby use is made of a membrane separation, can be improved by re-heating the gas mixture that was cooled in the compressor installation before sending it through the membrane separator.

A higher output implies a higher selectivity of the separation process, a greater purity and less losses of the separated gases and a higher permeability of the membrane separator for the same aimed purity of the separated gases.

Re-heating the gas mixture to be treated after it has left the compressor installation was done until now by means of heat coming from an external heat source such as an electrical resistance, a steam circuit or the like.

A disadvantage of such an external heat source is that re-heating the gas mixture to be treated requires extra energy, which is of course disadvantageous to the production costs and the cost price of the separated gases.

The present invention aims to remedy the above-mentioned and other disadvantages by providing an improved method for separating gases from a gas mixture, whereby the gas mixture to be treated is led through a membrane separator by means of a compressor installation and whereby the compressed gas mixture to be treated is cooled in the compressor installation, among others in order to separate condensate from the gas mixture, after which, when leaving the compressor installation, it is re-heated before it ends up in the membrane separator, and whereby, in order to re-heat the gas mixture to be treated as it leaves the compressor installation, use is made of the recuperation heat of the compressor installation itself.

An advantage of such an improved method according to the invention is that the re-heating of the gas mixture to be treated in order to maximize the output of the membrane separator does not lead to any extra energy costs, so that the aimed separation of gases can be done more selectively and at a favourable cost price.

Preferably, in order to re-heat the gas mixture to be treated, use is made of the heat of the compressed gas mixture at the exit of a compressor element of the compressor device, whereby more particularly the heat will be used which is drawn from the gas mixture to be treated at the exit of a compressor element during the cooling for separating condensate as mentioned above.

When more particularly a compressor element with liquid injection is used, whereby the injected liquid is separated in the known manner at the exit of the compressor element concerned and is subsequently carried back to the compressor element so as to be injected again, use can also be made, for re-heating the gas mixture to be treated as it leaves the compressor installation, of the heat of the separated liquid.

If the compressor installation is equipped with a cooler which makes use of a cooling medium, for example for cooling one or several compressor elements, the recuperation heat of said cooling medium can be used in an energy-saving manner in order to re-heat the gas mixture to be treated as it leaves the compressor installation.

It goes without saying that, in order to re-heat the gas mixture to be treated, the heat of the compressed gas mixture and/or the heat of the recycled injection liquid and/or the heat of the cooling medium of a cooling circuit or the like can be used simultaneously and in combination.

The compressed gas in the compressor installation is preferably dried and filtered before being led in the membrane, in order to remove liquid drops, specks of dirt and other impurities from the gas mixture which could stop up or damage the membrane separator.

The invention also concerns an improved device for separating gases from a gas mixture according to the above-described method, which device mainly consists of a compressor installation with an inlet and an outlet for the gas mixture to be treated and a membrane separator whose entry is connected to the above-mentioned outlet of the compressor installation via a supply line, characterised in that a radiator is incorporated in this supply line through which the gas mixture to be treated flows and which is part of at least one heat exchanger of the compressor installation itself.

In order to better explain the characteristics of the invention, the following preferred embodiment of an improved device according to the invention for separating gases from a gas mixture is given as an example only without being limitative in any way, with reference to the accompanying drawings, in which:

FIGS. 1 to 7 schematically represent different variants of an improved device according to the invention.

The improved device 1 from FIG. 1 mainly consists of a compressor installation 2 and a membrane separator 3 which is connected to this compressor installation 2.

The compressor installation 2 in this case consists of a compressor element 4, more particularly an oil-free compressor element, whose inlet is connected, via a suction filter 5, by means of a suction line 6, to the inlet 7 of the compressor installation 2, whereas the outlet of the compressor element 4 is connected to the outlet 9 of the compressor installation 2 by means of a compressed air line 8.

In the compressed air line 8 is provided a heat exchanger 10 which is composed, in the known manner, of two radiators placed opposite each other, 11 and 12 respectively, whereby the radiator 11 is incorporated in the above-mentioned compressed air line 8 towards the outlet 9 of the compressor installation 2.

Behind the radiator 11 is incorporated a water separator 13 in the same compressed air line 8.

Opposite to the heat exchanger 10 is provided a fan 14 which is directed onto the heat exchanger 10.

The above-mentioned membrane separator 3 has an entry 15 which is connected to the above-mentioned outlet 9 of the compressor installation 2 by means of a supply line 16, whereby the above-mentioned second radiator 12 of the heat exchanger 10 of the compressor installation 2 is incorporated in this supply line 16.

The membrane separator 3 is in this case provided with two exits, 17 and 18 respectively, but it may also have several exits.

The working and use of the device 1 for separating gases from a gas mixture is very simple and as follows.

The gas mixture to be treated, for example ambient air, is sucked in by the compressor installation, as represented in FIG. 1, via the inlet 7 and the filter 5, and it is compressed by the compressor element 4 and forced via the compressed air line 8 through the radiator 11 and the water separator 13, and subsequently led via the supply line 16 through the radiator 12 and the membrane separator 3, whereby in this membrane separator 3, the gas mixture is separated into two or more components in the known manner, for example nitrogen and oxygen, which are collected at the respective exits 17-18.

The relatively cold flow of air which is generated by the fan 14 successively flows through the meshes of the radiator 11 and through the meshes of the radiator 12 of the heat exchanger 10, as a result of which the hot gas mixture to be treated flowing directly out of the compressor element 4 through the radiator 11 will be cooled and then, after further cooling in the water separator 13, will be re-heated in the radiator 12 before flowing to the membrane separator 3.

In the water separator 13, water vapour from the gas mixture to be treated is separated by means of condensation or the like, as a result of which is prevented that the membrane separator would be saturated by water, which would be disadvantageous to the good working thereof.

As the gas mixture to be treated, after it has left the compressor installation, is re-heated before flowing through the membrane separator, the gas separation in the membrane separator will be more efficient.

Although in the given example of FIG. 1, the entire output of the compressor element 4 flows through the membrane separator, it is not excluded that, according to a variant, only a part of this output will be led through the membrane separator via a branching of the compressed air line 8 or the like.

FIG. 2 represents a variant of FIG. 1, whereby a two-stage compressor is applied in this case with two compressor elements 4 placed in series behind each other and which are connected to each other via an intermediate line 19 in which are incorporated an intermediate cooler 20 and an extra water separator 13 for the intermediate cooling and drying of the gas mixture to be treated.

The heat exchanger 10 is not an air-cooled heat exchanger as in FIG. 1 in this case, but it is cooled by a separate cooling circuit 21 with an extra cooling radiator 22 and a cooling liquid which absorbs heat from the radiator 11 and gives this heat back at the height of the radiator 12 to thus re-heat the gas mixture to be treated as it leaves the compressor installation 2.

FIG. 3 represents a variant, whereby in this case, as compared to the device from FIG. 2, an additional dryer 23 is provided which is filled with a desiccant, whereby this dryer 23 is incorporated behind the water separator 13 in the above-mentioned compressed air line 8 and which provides for an extra drying of the gas mixture to be treated.

If required, the compressor installation 2 can be equipped with the necessary features which make it possible to regenerate the saturated or partly saturated desiccant in the known manner.

FIG. 4 represents a variant whereby an extra cooler 24 is applied between the heat exchanger 10 and the water separator 13 which allows for extra cooling of the gas mixture to be treated so as to be able to separate more water by means of condensation in the water separator 13.

It is clear that also the recuperation heat of this extra cooler 24 can be used for re-heating the gas mixture to be treated.

FIG. 5 represents another variant of a device 1 according to the invention.

In this case, a compressor element 4 with liquid injection is applied whereby a liquid separator is provided at the exit of the compressor element 4 in the compressed air line 8, and whereby the exit of this liquid separator 25 is connected to the liquid injection system 27 of the compressor element 4 via a return line 26, whereby a radiator 28 is provided in the return line 26 which is part of a heat exchanger 29 comprising a second radiator 30, which second radiator 30 is incorporated, in the supply line 16 to the membrane separator 3.

The heat exchanger 29 is equipped with a fan 31.

In the compressed air line 8, after the oil separator 25, is provided a cooler 24 which is followed by a water separator 13 and which is in turn followed by a filter 32 or by a set of filters and adsorption elements.

The fan 31 blows relatively cool ambient air through the radiators 28-30 concerned, as a result of which there is a heat transfer between the hot injection liquid in the first radiator 28 and the gas mixture to be treated flowing through the second radiator 30, such that this gas mixture, as it leaves the compressor installation 2, will be re-heated before being led in the membrane separator 3, and a better output of the membrane separator 3 is obtained.

Thanks to the filter 32 or set of filters which are erected at the coldest point in the compressed air line, vapours, specks of dirt and other impurities from the gas mixture to be treated will be filtered by means of adsorption, condensation or the like.

The device according to FIG. 6 differs from the device in FIG. 5 in that in the compressed air line 8, between the water separator 13 and the filter 32, is provided an additional cool dryer 33 consisting of a heat exchanger 34, a heat exchanger 36 connected to a cooling circuit 351 and an additional water separator 13, whereby in the heat exchanger 34 of the cool dryer 33, the gas mixture to be treated, after having been cooled in the heat exchanger, is re-heated and whereby this gas mixture, after it has passed through the filter 32, is further heated in the heat exchanger 29 before it ends up in the membrane separator 3.

FIG. 7 represents another variant of the device from FIG. 5, whereby a by-pass line 37 is in this case provided in the return line 26 which bridges the above-mentioned radiator 28 and in which an adjustable valve 38 is provided which is part of a control circuit 39 with a temperature sensor 40 which is erected in the supply line 16 at the entry 15 of the membrane separator 3.

In this case, as a function of the position of the valve 38, the output of the injection liquid is split in a part going through the radiator 28 and a part flowing directly to the injection system 27 via the by-pass line 37, such that the heat transfer in the heat exchanger 29 is a function of the position of the valve 38.

The control circuit 39 makes sure that the opening of the valve 38 is controlled such that the temperature of the gas mixture to be treated is constant at the entry 15 of the membrane separator 3 and equal to a set target value.

An additional cooling radiator 41 in this case makes sure that when the valve 38 is entirely open, the injection liquid will still be sufficiently cooled in order to prevent any damage to the compressor element 4.

It is clear that the above-described method and devices can be applied with good results on all types of membrane separators 3, either with or without applying a gas to wash the separated gases.

The present invention is by no means restricted to the embodiments given as an example and represented in the accompanying drawings; on the contrary, such a method and device according to the invention can be made according to different variants while still remaining within the scope of the invention.

The invention claimed is:

1. Method for separating gases from a gas mixture, wherein the gas mixture to be treated is passed through a membrane separator by means of a compressor installation comprising a compressor element with liquid injection whose injected liquid is separated in a heated state at the exit of the compressor element, by a liquid separator, wherein the compressor installation generates heat available for recuperation heating and wherein the compressed gas mixture to be treated is cooled at least in the compressor installation to separate condensate from the gas mixture, after which, as the compressed gas mixture leaves the compressor installation, the compressed gas mixture is re-heated before it is passed through membrane separator, comprising the step: said reheating comprising using the heat of the separated liquid to re-heat the gas mixture.

2. Method according to claim 1, wherein, during the reheating step, use is made of the heat of the compressed gas mixture at the exit of a compressor element of the compressor installation.

3. Method according to claim 1, wherein, during the reheating step, use is made of a recuperation heat which is drawn from the compressed gas mixture to be treated while carrying out said cooling step.

4. Method according to claim 1, wherein the compressor installation is equipped with a cooler for cooling the compressed gas mixture and in which a cooling medium is heated by the compressed gas mixture and thereby contains heat available for recuperation heating, comprising using the recuperation heat of the cooling medium during the reheating step.

5. Method according to claim 1, wherein after the cooling of the gas mixture, the gas mixture is passed through a dryer.

6. Method according to claim 5, wherein said dryer uses a desiccant.

7. Method according to claim 5, wherein the dryer is a cooling type dryer.

8. Method according to claim 1, wherein, after the cooling of the gas mixture the gas mixture is passed through a filter or through a set of filters and adsorption elements.

9. Device for separating gases from a gas mixture comprising:

a compressor installation having an inlet and an outlet for a gas mixture to be treated, said compressor installation comprising a compressor element with liquid injection and a liquid separator incorporated in a compressed air line located at the exit of the compressor element, said exit being connected to the liquid injection system via a return line and a membrane separator whose entry is connected to the outlet via a supply line; and a radiator in the supply line through which the gas mixture to be treated flows, wherein the radiator is part of a heat exchanger included in said return line.

10. Device according to claim 9, wherein the heat exchanger is incorporated in a compressed air line between the exit of a compressor element and the exit of the compressor installation.

11. Device according to claim 10, wherein the heat exchanger is a cooler which is part of a cooling type dryer of the compressor installation.

12. Device according to claim 9, wherein the compressor installation includes at least one cooling circuit and wherein the heat exchanger in the supply line to the membrane separator is part of the cooling circuit.

13. Method according to 1, wherein the compressor installation further comprises a radiator positioned between the liquid separator and the membrane separator, which radiator forms a primary side of a heat exchanger, and wherein the compressor installation further comprises a by-pass line including an adjustable valve bridging a secondary side of the heat exchanger, wherein during the reheating step, the use of the heat of the separated liquid to re-heat the gas mixture is a function of the position of the valve.

14. Device according to claim 9, wherein said radiator forms a primary side of the heat exchanger and wherein the compressor installation further comprises a by-pass line including an adjustable valve bridging the a secondary side of the heat exchanger.

* * * * *